Jan. 23, 1962 L. STERN 3,017,859
BIRD FEEDING DEVICES
Filed Nov. 17, 1960

INVENTOR.
LEONARD STERN
BY
ATTORNEY

United States Patent Office 3,017,859
Patented Jan. 23, 1962

3,017,859
BIRD FEEDING DEVICES
Leonard Stern, New York, N.Y., assignor to Hartz Mountain Products Corp., New York, N.Y., a corporation of Delaware
Filed Nov. 17, 1960, Ser. No. 70,052
9 Claims. (Cl. 119—51)

This invention relates to bird feeding devices.

The need for feeding fresh greens to birds has been well established, and with this need in view it is my objective to provide a device, preferably attachable to a bird cage, for enabling a bird to feed on continuously growing greens. And in this aspect of my invention it is an object thereof to so locate the growing greens with respect to a bird perch that a bird will be enabled conveniently to eat the greens while in a comfortable and natural position.

It is a further object of this invention to provide a combination of soil and water containers with such enclosure means that said containers are fully protected against contact, damage and contamination. And in this aspect of my invention it is a further object to prevent access by birds to the seeded soil constituting the source of plant growth, and to enable access only to the upper more nutrient portions of the growing greens.

Still a further object of this invention is to provide a device of this category wherein the soil container is detachably connected in place, so that it can be readily replaced with a fresh unit.

Another object is to provide means for maintaining the said soil container at a predetermined position with respect to the feeding level. And in this aspect of my invention it is a further object to provide shelf means serving both as reinforcements for the water container, and as means to prevent an inadvertent dropping of the soil container below the desired feeding level.

Still another object of my invention is to provide a water supply trough communicating with the interior of the water container, yet positioned and proportioned so as to extend outwardly beyond the bird cage housing the device, for convenient water replacement purposes. And in this aspect of my invention it is a further object thereof to enable said trough to be detachably secured to the wires of the cage.

And it is my objective to provide a relatively simple, easily fabricated and attractive device having the functions and advantages hereinabove mentioned.

Other objects, features and advantages will appear from the drawings and the description hereinafter given.

Referring to the drawings.

Figure 1:
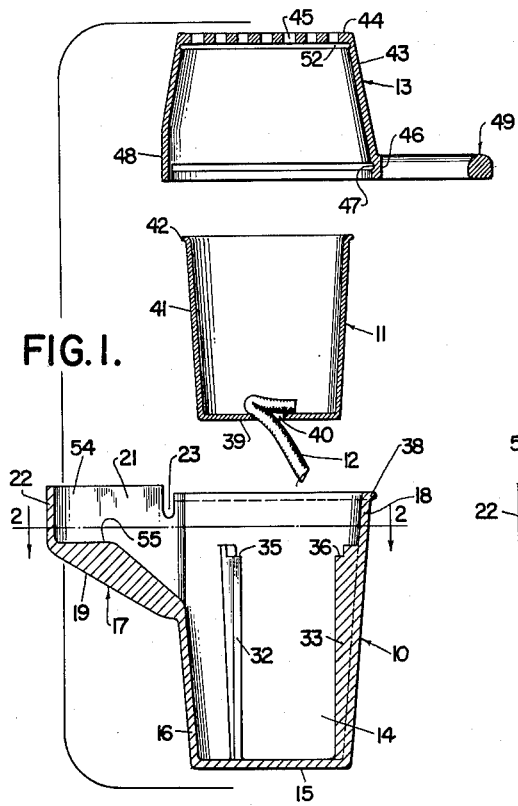
FIGURE 1 is a disassembled vertical sectional view of the components of this invention.
Figure 2:
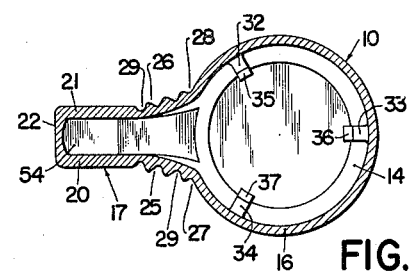
FIGURE 2 is a section of FIGURE 1 taken along line 2—2.
Figure 3:
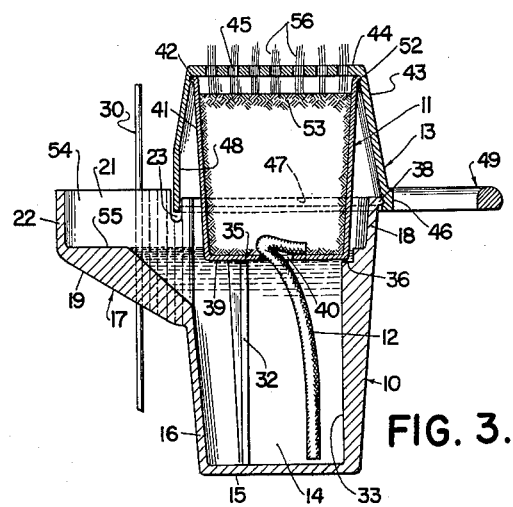
FIGURE 3 is a vertical sectional view of the said components in assembled relation, showing water, soil and greens operatively in place, and showing a fragment of a bird cage wire in engagement with the trough.
Figure 5:
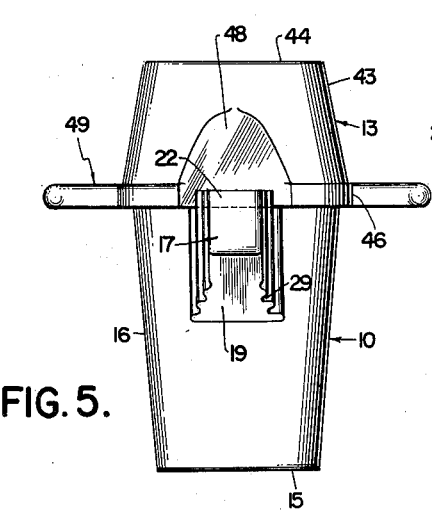
FIGURE 5 is a rear view of FIGURE 4, without the bird cage.
Figure 4:
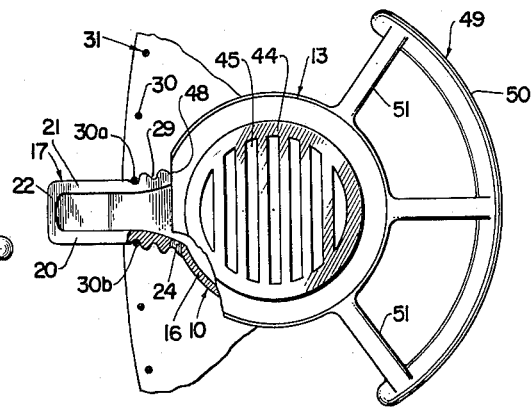
FIGURE 4 is a top view of FIGURE 3, a fragment being sectioned for clarity, a portion of a bird cage being shown.

In the form of my invention illustrated, the three main components are the water container 10, the soil container 11 with the wick 12 therein, and the cover member 13. Within said water container 10 is the internal chamber 14 serving as the water reservoir, said container comprising the base 15, the substantially conical lateral wall 16, the trough 17 and the upper annular portion generally designated 18—said upper portion enveloping the lower portion of the soil receptacle 11 when it is in operative position, as shown in FIG. 3. The said trough comprises the rearwardly and upwardly sloping bottom wall 19, the opposite lateral walls 20 and 21, and the rear wall 22. The said oppositely positioned walls 20 and 21 contain the slotted portions 23 and 24 extending downwardly from the upper edges thereof for accommodating the rear of the cover member 13, as will more clearly hereinafter appear. The said trough walls 20 and 21 are flared forwardly and outwardly at portions 25 and 26, these walls joining the lateral wall 16 at portions designated 27 and 28, respectively. Said portions 25 and 26 have serrated or grooved portions generally designated 29 for frictional engagement with adjacent vertical wires 30 of the cage, generally designated 31, housing the device. Preferably integral with the inner portion of the lateral wall 16 of the container 10 are the ribs 32, 33 and 34, the upper portions of said ribs containing the recessed portions or shelves 35, 36 and 37, the positions of said shelves being such as to prevent the soil container 11 from dropping down below a predetermined optimum feeding level, in the manner hereinafter to be described. The uppermost portion of the water container 10 contains the peripheral lip 38 extending to the said opposite recessed portions 23 and 24.

The soil container 11 has a base 39 with an apertured portion 40 therein through which extends the said wick 12, the lateral wall 41 of container 11 having at the top thereof the peripheral lip 42. The said wick 12 is of sufficient length to extend downwardly into the bottom of the chamber 14 of the water container, as illustrated in FIG. 3, the upper portion of the wick being enveloped by the soil in container 11.

The said member 13 comprises an annular and preferably, although not necessarily, conical wall 43, the top of member 13 having the apertured roof 44 extending entirely across the said conical wall 43—the said roof having, in the form of my invention illustrated, the parallel apertured portions generally designated 45 to permit growing greens to extend upwardly therethrough, as shown in FIGURE 3. The bottom of member 13 is open, the opening being defined by the peripheral rim 46 the inner portion of which has an annular groove 47 extending to the vertically disposed flat wall portion 48 at the rear of wall 43. Preferably integral with the rim 46 and extending forwardly and laterally therefrom is the perch portion 49 having the arcuate stand 50 and radial supporting arms generally designated 51. The inner portion of the said annular wall 43 contains, adjacent the said roof 44, the annular groove 52 proportioned to frictionally and detachably receive therein the said peripheral lip 42 of the soil container 11.

The said soil container 11 is a renewable and replaceable member, it being intended that such soil containers be obtainable, with seeded soil 53 therein, separate and apart from the other components of this invention.

In operatively assembling the components of this device, the soil container 11 is first inserted through the bottom opening of the cover member 13, the said peripheral lip 42 being brought into engagement with the said annular grooved portion 52. It is preferred that the relative proportions of the said lip 42 and annular groove 52 be such that the container will readily snap into place, and also be adapted for ready detachment upon a downward pull exerted upon the said container 11. The assembled combination of members 11 and 13 is then brought into operative engagement with the water container 10, the said soil container 11 being positioned within the confines of the said upper annular portion 18 of the water container, and the annular grooved portion 47 of the cover member 13 being brought into frictional engagement with the said lip 38 of the water container 10, the relative proportions of said grooved portion 47 and lip 38 being such as to permit their ready detachable engagement. When the parts are assembled in the manner above described, the said flat vertical rear portion 48 will be positioned within the said oppositely positioned slotted portions 23 and 24, as aforesaid. The entire assembled device is then positioned within cage 30, the trough portion 17 being pushed outwardly between two adjacent wires 30a and 30b of said cage, so that the rearmost portion of the trough is disposed outside of the cage.

Water can thus be readily introduced into the water container 10 through the trough top opening 54, it being preferred, though not required, that the level of the water—readily visible through said opening 54—be at the level of the floor 55 of the trough. With the parts so assembled, the soil 53 will be supplied with moisture by the capillary action of the wick 12, in known manner. After the seeds within the soil 53 germinate, greens 56 will grow upwardly and extend out beyond the apertured portions 45 of the roof of the device.

It is apparent that a bird standing on perch 49 will be conveniently positioned for eating the greens extending above the said roof 44. Inasmuch as the entire soil container 11 is surrounded by the lateral wall 43 of the cover member 13, it is impossible for the bird to reach into the interior of the device, so that the bird can neither dislodge the soil container 11 nor gain access to any seeds which may be present at the top of the soil mass, nor even reach the less edible portions of the greens below the said roof 44. Moreover, since substantially the entire portion of the top of the water container 11 is covered by member 13, it is virtually impossible for a bird positioned within the cage to soil or contaminate the water within the container 10.

Due to the flared disposition of the said wall portions 25 and 26, it is apparent that the trough portion of container 10 can be operatively affixed to cages with differently spaced wires, particularly in view of the fact that there are a plurality of grooved portions 29.

If it is desired to replace a soil container 11 with a fresh one, all that need be done is to remove the cover 13 from the water container 10, and then detach the soil container from the cover member, in the manner aforesaid, the new soil container being then snapped into place.

If, for any reason, the soil container 11 should become detached from the cover 13—or if it had not been securely attached thereto—the said shelves 35, 36 and 37 of the reinforcing ribs 32, 33 and 34 will receive thereupon the base 39 of the soil container 11, holding it at that level. It will be observed that when the soil container 11 is in its attached operative position illustrated in FIG. 3, the base 39 is spaced slightly above the said shelves. The arrangement is hence such that even if the soil container should inadvertently become detached, it will still be at a proper level to enable growing greens to protrude upwardly beyond the said roof 44 at a convenient feeding level.

In the above description, the invention has been disclosed merely by way of example, and in preferred manner; but obviously many variations and modifications may be made therein. It is to be understood, therefore, that the invention is not limited to any specific form or manner of practicing same, except insofar as such limitations are specified in the appended claims.

I claim:
1. In a greens feeder for birds, a water container, a soil container, water conducting means between said containers, and a cover member; said cover member having a roof with apertured portions therein, an annular wall depending from said roof, and a bottom peripheral portion defining a bottom opening, said soil container being detachably connected to the interior portion of said cover member, said soil container having a lateral annular wall and a base adapted to contain therein a mass of seeded soil, the upper portion of said soil container being open and disposed in substantial registry with said apertured portions of said roof, said water container having an upper annular portion and a lower water reservoir portion communicating therewith, said peripheral portion of said cover member being in detachable engagement with said upper annular portion of said water container, the soil container being so proportioned and positioned that the lower portion thereof is disposed within said upper annular portion of said water container, said annular wall of said cover member enveloping that portion of the soil container extending above said water container.

2. In a greens feeder for birds, the combination according to claim 1, said water container having a trough extending outwardly therefrom substantially at the level of said upper annular portion thereof, said trough communicating with the interior of said water container.

3. In a greens feeder for birds, the combination according to claim 1, said water container having a trough extending outwardly therefrom substantially at the level of said upper annular portion thereof, said trough communicating with the interior of said water container, said trough comprising a floor, two opposite lateral walls and a rear wall, said lateral walls being flared outwardly and forwardly.

4. In a greens feeder for birds, a water container, a soil container, water conducting means between said containers, and a cover member; said cover member having a roof with apertured portions therein, an annular wall depending from said roof and a bottom peripheral portion defining a bottom opening, said soil container comprising a lateral annular wall and a base adapted to contain therein a mass of seeded soil, the upper portion of said last-mentioned lateral wall being detachably connected to the inner surface of said annular wall of said cover member adjacent said roof, said water container having an upper annular portion and a lower water reservoir portion communicating therewith, said peripheral portion of said cover member being in detachable engagement with said upper annular portion of said water container, the soil container being so proportioned and positioned that the lower portion thereof is disposed within said upper annular portion of said water container, said annular wall of said cover member enveloping that portion of the soil container extending above said water container.

5. In a greens feeder for birds, the combination according to claim 4, said water container having a trough extending outwardly therefrom substantially at the level of said upper annular portion thereof, said trough communicating with the interior of said water container, said trough comprising a floor, two opposite lateral walls and a rear wall, said lateral walls having opposite slotted portions extending downwardly from the upper edges thereof, the rear of said bottom peripheral portion of the cover member being disposed within said slotted portions.

6. In a greens feeder for birds, a water container, a soil container, water conducting means between said containers, and a cover member; said cover member having a roof with apertured portions therein, an annular wall depending from said roof, a bottom peripheral portion defining a bottom opening, and a bird perch extending from said bottom peripheral portion; said soil container being detachably connected to the interior portion of said cover member, said soil container having a lateral annular wall and a base adapted to contain therein a mass of seeded soil, the upper portion of said soil container being open and disposed in substantial registry with said apertured portions of said roof, said water container having an upper annular portion and a lower water reservoir portion communicating therewith, said peripheral portion of said cover member being in detachable engagement with said upper annular portion of said water container, the soil container being so proportioned and positioned that the lower portion thereof is disposed within said upper annular portion of said water container, said annular wall of said cover member enveloping that portion of the soil container extending above said water container.

7. In a greens feeder for birds, a water container, a soil container, water conducting means between said containers, and a cover member; said cover member having a roof with apertured portions therein, an annular wall depending from said roof, and a bottom peripheral portion defining a bottom opening, said soil container being detachably connected to the interior portion of said cover member, said soil container having a lateral annular wall and a base adapted to contain therein a mass of seeded soil, the upper portion of said soil container being open and disposed in substantial registry with said apertured portions of said roof, said water container having an upper annular portion and a lower water reservoir portion communicating therewith, said peripheral portion of said cover member being in detachable engagement with said upper annular portion of said water container, the soil container being so proportioned and positioned that the lower portion thereof is disposed within said upper annular portion of said water container, and shelf means within said reservoir portion and disposed below the base of said soil container.

8. In a greens feeder for birds, the combination according to claim 7, said shelf means being in spaced adjacent relation to said base when the soil container is operatively attached to said cover member.

9. In a greens feeder for birds, the combination according to claim 7, said shelf means comprising a plurality of ribs integral with said reservoir portion, the upper portions of the respective ribs being disposed below said base of the soil container.

References Cited in the file of this patent
UNITED STATES PATENTS 2,699,752   Reyes ------------------ Jan. 18, 1955
2,937,617   Brody et al. ------------ May 24, 1960